(No Model.)

J. F. STOLTS.
TIRE SETTER.

No. 263,239. Patented Aug. 22, 1882.

Attest:
Charles Pickles
P. W. Hopkins

Inventor:
Joseph F. Stolts
By Knight Bros
Attys

UNITED STATES PATENT OFFICE.

JOSEPH F. STOLTS, OF ST. LOUIS, MISSOURI.

TIRE-SETTER.

SPECIFICATION forming part of Letters Patent No. 263,239, dated August 22, 1882, Application filed May 31, 1882. (No model.)

*To all whom it may concern:*

Be it known that I, JOSEPH F. STOLTS, of the city of St. Louis, in the State of Missouri, have invented a certain new and useful Improvement in Tire-Setters, of which the following is a full, clear, and exact description, reference being had to the accompanying drawings, forming part of this specification, and in which—

Figure 1:
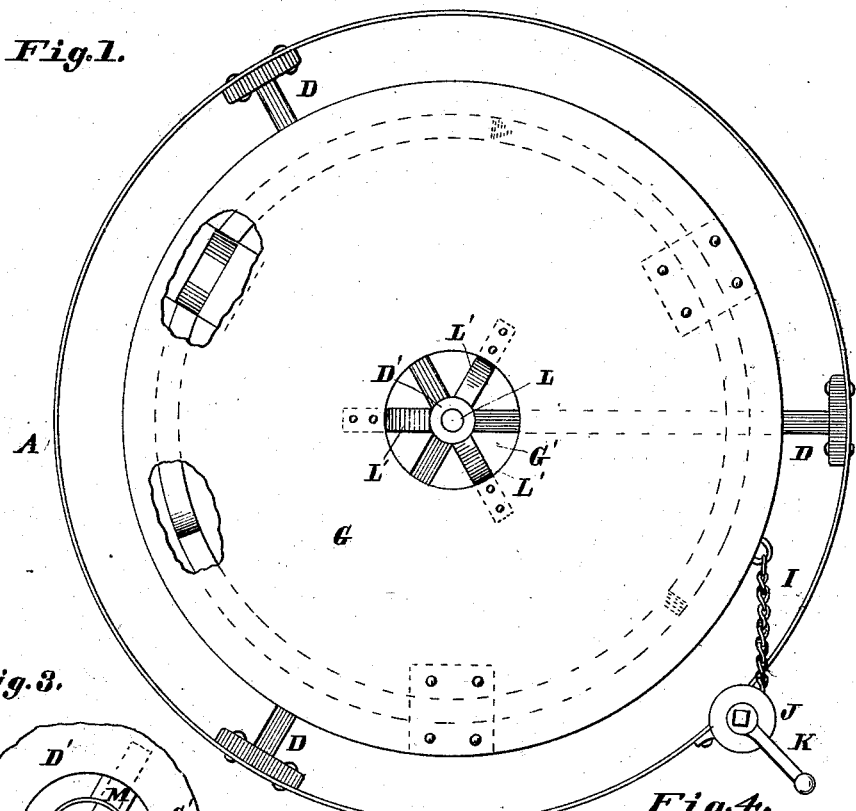
Figure 3:
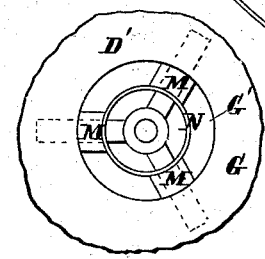
Figure 4:
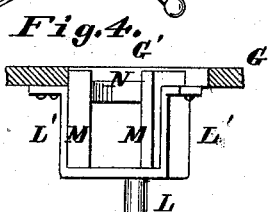
Figure 2:
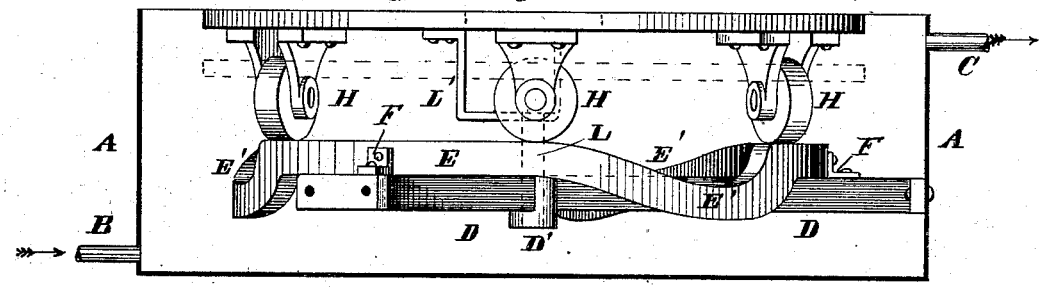

Figure 1 is a top view. Fig. 2 is a vertical section through the tank, showing the other parts in elevation; and Figs. 3 and 4 are detail views, illustrating the manner of arranging the central support of the wheels for different-sized hubs.

My invention relates to those devices for putting tires on wheels which consist of a table having rollers and adapted to be lowered and raised within a tank.

My improvement consists in a spider secured to the side of a tank supporting a circular track having depressed portions or inclines for lowering the wheels or rollers carrying the table, a central shaft for guiding the table, working through the center of the spider, and a chain, windlass, and winch for rotating the table, as hereinafter set forth.

My improvement consists, further, in combining with a table having an opening to receive the hub of the wheel, blocks for reducing the size of the aperture, placed on supporting-arms, and a ring for holding the blocks in position.

A represents a tank of suitable size, having a water-inlet pipe, B, at bottom, and a waste-pipe, C, near the top. It has secured to its sides a spider, D, upon the arms of which rests a three-way track, E. The track may be, and preferably would be, secured to the spider by angle-irons F.

G is a table supported on wheels H, which travel on the track E. By turning the table in one direction it will be seen that the wheels traveling down the inclines E' of the track will lower the table beneath the water. Then by turning the table in the other direction, by means of a chain, I, windlass J, and winch K, the windlass being secured to the side of the tank, it is brought up out of the water. The table is guided vertically and held upon the track by a shaft, L, secured to its bottom by arms L', working in the hub D' of the spider D. The table has a central opening, G', for receiving the hub of the wheel. Should the hole G' be too large for any particular wheel-hub, so that the wheel would not be held from side movement, I place blocks M (see Figs. 3 and 4) on the arms L' and place a ring, N, between them, the ring being of such a size as to fit the hub snugly.

In setting a tire the wheel is placed upon the table. The hot tire is then put on the wheel and then the table is lowered, as described, into the water. When the tire has been cooled off the table is turned by the windlass and brought into its upper position, out of the water.

I claim—

1. The combination of tank A, spider D, supported on the sides thereof, having central hub, D', circular track E, having inclines or depressions E', table G, having wheel-hub opening G', rollers H, supporting said table on said track, guiding-shaft L, secured to arms L', and chain or connection I, windlass J, and winch or handle K for rotating the table, as set forth.

2. The blocks M and ring N, in combination with table G, having wheel-hub opening G' and shaft-arms L', as and for the purpose set forth.

JOSEPH F. STOLTS.

Witnesses:
SAML. KNIGHT,
GEO. H. KNIGHT.